(12) United States Patent
David et al.

(10) Patent No.: US 12,243,034 B2
(45) Date of Patent: Mar. 4, 2025

(54) INTEGRATED UTILITY DISTRIBUTION AND AUTOMATED BILLING

(71) Applicant: Wells Fargo Bank, N.A., San Francisco, CA (US)

(72) Inventors: Daniel David, Charlotte, NC (US); Andrew J. Garner, IV, State Road, NC (US); Rajib Roy, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/197,520

(22) Filed: May 15, 2023

(65) Prior Publication Data

US 2023/0281586 A1    Sep. 7, 2023

Related U.S. Application Data

(60) Continuation of application No. 17/328,292, filed on May 24, 2021, now Pat. No. 11,651,340, which is a
(Continued)

(51) Int. Cl.
| | |
|---|---|
| *G06Q 20/14* | (2012.01) |
| *G06Q 20/10* | (2012.01) |
| G06Q 50/06 | (2012.01) |

(52) U.S. Cl.
CPC ......... *G06Q 20/145* (2013.01); *G06Q 20/102* (2013.01); *G06Q 50/06* (2013.01)

(58) Field of Classification Search
CPC ..... G06Q 20/145; G06Q 20/102; G06Q 50/06
(Continued)

(56) References Cited

U.S. PATENT DOCUMENTS

| | | |
|---|---|---|
| 5,483,445 A | 1/1996 | Pickering |
| 5,870,140 A | 2/1999 | Gillberry |

(Continued)

FOREIGN PATENT DOCUMENTS

| | | |
|---|---|---|
| WO | WO-01/91073 | 11/2001 |

OTHER PUBLICATIONS

"Design and Implementation of Smart Billing and Automated Meter Reading System for Utility Gas," by Muhammad Feheem Khan; Ahmed Zoha and Rana Liaqat Ali. 2007 International Conference on Information and Emerging Technologies, Karachi, 2007, pp. 1-6. Conference held: Jul. 6-7, 2007. (Year: 2007).
(Continued)

*Primary Examiner* — Sara C Hamilton
(74) *Attorney, Agent, or Firm* — Foley & Lardner LLP

(57) ABSTRACT

Controlling provision of a set of utilities by a financial institution. The method includes receiving, by a processor of a financial institution computing system associated with a financial institution, utility usage information from a set of utility meters associated with a plurality of customers of the utility company. The method includes determining a utility account balance for a customer of the plurality of customers based at least in part by an aggregate amount of utility usage used by the plurality of customers for a billing cycle by aggregating the received utility usage information for the billing cycle. The method includes determining that the utility account balance exceeds a threshold permitted past due amount. The method includes sending a stop signal to a utility meter associated with the customer, the stop signal instructing the utility meter to cut off provision of the utility to a property serviced by the utility meter.

20 Claims, 5 Drawing Sheets

Related U.S. Application Data division of application No. 15/350,693, filed on Nov. 14, 2016, now Pat. No. 11,030,595.

(60) Provisional application No. 62/255,845, filed on Nov. 16, 2015.

(58) Field of Classification Search
USPC .......................................................... 705/40
See application file for complete search history.

(56) References Cited

U.S. PATENT DOCUMENTS

| | | | |
|---|---|---|---|
| 6,980,973 B1 * | 12/2005 | Karpenko | G06Q 50/06 |
| | | | 705/412 |
| 7,236,950 B2 | 6/2007 | Savage et al. | |
| 7,385,524 B1 | 6/2008 | Orlosky | |
| 7,702,779 B1 | 4/2010 | Gupta et al. | |
| 9,734,708 B2 | 8/2017 | Field | |
| 2003/0009301 A1 | 1/2003 | Anand et al. | |
| 2004/0117223 A1 | 6/2004 | Smith | |
| 2004/0150384 A1 | 8/2004 | Holle et al. | |
| 2004/0243524 A1 | 12/2004 | Crichlow | |
| 2006/0190140 A1 | 8/2006 | Soni | |
| 2007/0260562 A1 | 11/2007 | Hutson et al. | |
| 2008/0033892 A1 | 2/2008 | Neri-Badillo | |
| 2009/0058676 A1 | 3/2009 | Orlosky | |
| 2009/0135836 A1 | 5/2009 | Veillette | |
| 2009/0307117 A1 | 12/2009 | Greiner et al. | |
| 2010/0217549 A1 | 8/2010 | Galvin et al. | |
| 2011/0074600 A1 | 3/2011 | Cornwall et al. | |
| 2011/0225072 A1 * | 9/2011 | Sewell | G06Q 50/06 |
| | | | 705/30 |
| 2012/0078548 A1 | 3/2012 | Salazar et al. | |
| 2012/0226605 A1 | 9/2012 | Veerubhotla | |
| 2012/0232915 A1 | 9/2012 | Romberger | |
| 2013/0066773 A1 | 3/2013 | Chou et al. | |
| 2013/0080323 A1 | 3/2013 | Scipioni | |
| 2013/0132244 A1 | 5/2013 | Jenkins et al. | |
| 2013/0293219 A1 | 11/2013 | Ramirez et al. | |
| 2013/0311380 A1 | 11/2013 | Vines et al. | |
| 2014/0077968 A1 | 3/2014 | Alberth et al. | |
| 2014/0223526 A1 | 8/2014 | Lu et al. | |
| 2014/0225742 A1 | 8/2014 | Wenger et al. | |
| 2014/0236508 A1 | 8/2014 | Mcgowan et al. | |
| 2014/0279712 A1 | 9/2014 | Ortner | |
| 2014/0337188 A1 | 11/2014 | Bennett et al. | |
| 2015/0193842 A1 | 7/2015 | Wada et al. | |
| 2015/0220904 A1 | 8/2015 | Gibson et al. | |
| 2015/0324776 A1 | 11/2015 | Wada et al. | |
| 2017/0032432 A1 | 2/2017 | Kaufmann et al. | |

OTHER PUBLICATIONS

"Wireless Automated Digital Energy Meter," by P. Bharath; N. Ananth; S. Vijetha; and K.V. Jyothi Prakash. ICSET. 2008. (Year: 2008).

* cited by examiner

INTEGRATED UTILITY DISTRIBUTION AND AUTOMATED BILLING

CROSS-REFERENCE TO RELATED APPLICATIONS

This application is a continuation of U.S. patent application Ser. No. 17/328,292, entitled "INTEGRATED UTILITY DISTRIBUTION AND AUTOMATED BILLING," by David et al., filed May 24, 2021, which is a divisional of U.S. patent application Ser. No. 15/350,693, entitled "INTEGRATED UTILITY DISTRIBUTION AND AUTOMATED BILLING," by David et al., filed Nov. 14, 2016, which claims priority to U.S. Provisional Patent Application No. 62/255,845, entitled "INTEGRATED UTILITY DISTRIBUTION AND AUTOMATED BILLING," by David et al., filed on Nov. 16, 2015, all of which are herein incorporated by reference in their entirety and for all purposes.

TECHNICAL FIELD

The present disclosure relates to systems and method for utility distribution and payment.

BACKGROUND

Utility companies provide a plurality of customers with access to utilities (e.g. electricity, water, gas, cable, etc.). To receive payment for the customers' utility usage, utility companies traditionally seek payment by generating individualized bills for each customer, sending the individualized bills to the respective customer (e.g., electronically or via paper mail), and then by receiving and processing separate payments from each customer. Further, financial institutions that hold accounts for each customer typically process a large number of individual customer bill payments for each utility billing cycle (e.g., individual customer checks, individual customer bill pay instructions, individual customer electronic funds transfers, etc.).

The traditional utility billing and payment scheme is costly to both utility companies and financial institutions. Utility companies often employ entire work forces to generate bills and to collect on bills. Further, many utility companies are charged deposit or transfer fees by financial institutions and/or bill pay service providers associated with each incoming payment. Further, financial institutions have internal costs associated with each money transfer, such as automated clearing house (ACH) transaction fees, check processing fees, and the like. Customers also have expenses, such as bill pay fees and check costs, associated with utility bill payments.

SUMMARY

An example embodiment relates to a method of controlling provision of a set of utilities by a financial institution. The method includes receiving, by a processor of a financial institution computing system associated with a financial institution, utility usage information from a set of utility meters associated with a plurality of customers of the utility company. The plurality of customer are enrolled in an auto payment program offered by the financial institution and the utility company. The financial institution is a different entity than the utility company. The method further includes determining, by the processor, a utility account balance for a customer of the plurality of customers based at least in part by an aggregate amount of utility usage used by the plurality of customers for a billing cycle by aggregating, by the processor, the received utility usage information for the billing cycle. The method further includes determining, by the processor, that the utility account balance exceeds a threshold permitted past due amount. The method further includes sending, by the processor, a stop signal to a utility meter associated with the customer, the stop signal instructing the utility meter to cut off provision of the utility to a property serviced by the utility meter.

Another example embodiment relates to a system. The system includes a customer financial account database that stores customer financial information concerning a plurality of customers of a financial institution. The system further includes a customer utility company database that stores associations between a plurality of utility meters and the plurality of customers. Each of the plurality of customers are holders for an account with the financial institution and wherein the financial institution is a different entity than a utility company. The system further includes network interface configured to communicate data to and from the plurality of utility meters, a plurality of customer communication devices, and a utility company computing system associated with the utility company. The system further includes memory having stored thereon instructions. The system further includes a processor in communication with the memory. The processor upon execution of the instructions is configured to receive utility usage information from the plurality of utility meters. The processor is further configured to determine a utility account balance for a customer of the plurality of customers based at least in part by an aggregate amount of utility usage used by the plurality of customers for a billing cycle by aggregating the received utility usage information for the billing cycle. The processor is further configured to determine that the utility account balance exceeds a threshold permitted past due amount. The processor is further configured to send a stop signal to a utility meter associated with the customer, the stop signal instructing the utility meter to cut off provision of a utility to a property serviced by the utility meter.

Another example embodiment relates to a non-transitory computer-readable media that has computer-executable instructions embodied therein that, when executed by a processor of a financial institution computing system associated with a financial institution, cause the financial institution computing system to perform a process. The process includes receiving, over a network, utility usage information from a set of utility meters associated with a plurality of customers of a utility company. Each of the plurality of customers enrolled in a utility billing and payment program offered by the financial institution. The financial institution is a different entity than the utility company. The process further includes determining, a utility account balance for a customer of the plurality of customers based at least in part by an aggregate amount of utility usage used by the plurality of customers for a billing cycle by aggregating the received utility usage information for the billing cycle. The process further includes determining that the utility account balance exceeds a threshold permitted past due amount. The process includes sending, over the network, a stop signal to a utility meter associated with the customer, the stop signal instructing the utility meter to cut off provision of the utility to a property serviced by the utility meter.

These and other features, together with the organization and manner of operation thereof, will become apparent from the following detailed description when taken in conjunction with the accompanying drawings.

DETAILED DESCRIPTION

Referring generally to the figures, utility distribution and payment systems and methods are described in which a financial institution individually bills and collects from individual utility users and provides batch payment to the utility company. The financial institution facilitates the aggregate utility billing by agreeing with a utility company to serve as a billing service for a subset of utility and banking customers. Each of the customers agrees to participate in the billing service offered by the financial institution. The utility company provides the utility to the customers via smart meters located at the properties receiving the utility (e.g., the customer's home, business, or other property). The smart meters provide individualized usage information to both the utility company and the financial institution. At the end of a billing cycle, the financial institution sends one aggregate payment for all users of the subset to the utility company. The financial institution then collects funds from the utility customers associated with the batch payment by performing internal transfers within the financial institution. Accordingly, the described systems and methods eliminate the billing and collection responsibilities for the utility company.

Figure 1:
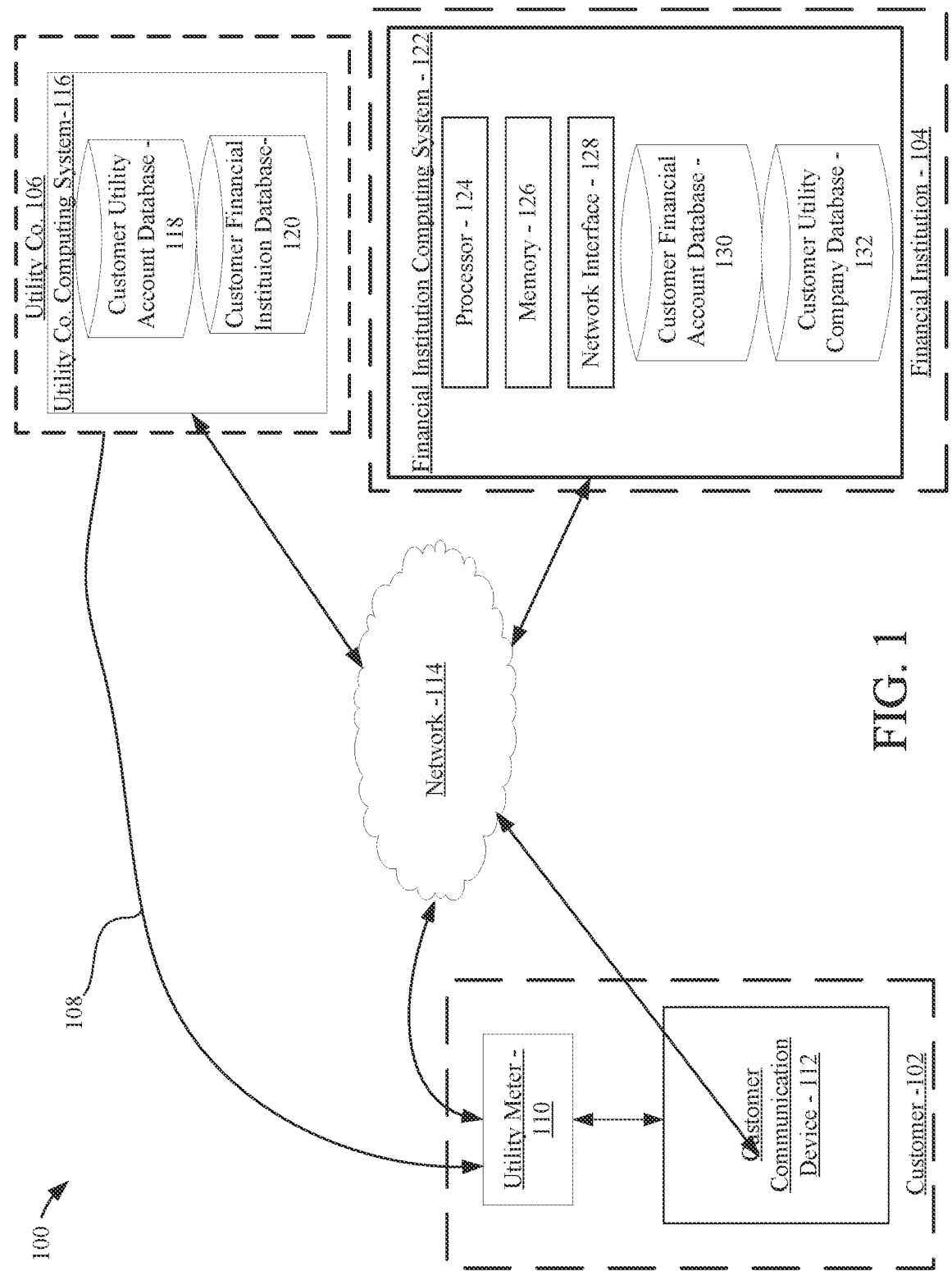
FIG. 1 is a diagram of a network of computing systems according to an example embodiment.

Referring to FIG. 1, a block diagram of a utility distribution and billing system 100 is shown according to an example embodiment. As described in further detail below, the system 100 facilitates both the delivering of a utility to a customer 102 (e.g., to a property of the customer 102) by a utility company 106 and payment for the utility usage of the customer 102 by a financial institution 104. The utility company 106 provides a utility (e.g. electricity, water, gas, cable, etc.) to the customer 102 via the utility line 108, and the utility meter 110 installed at the location receiving the utility tracks the utility usage of customer 102. Each of utility meters 110 is associated with an individual property of an identified customer 102. The customer 102 can be an individual, an organization, a government entity, or a business. In some arrangements, a given customer 102 can be associated with multiple utility meters 110. For example, a customer 102 may be a business having multiple locations, each of which receives the utility from the utility company 106, and each of which has its own utility meter 110.

In a traditional arrangement, the utility company 106 individually bills each customer 102 for that customer's utility usage based on that customer's utility usage data received from the utility meter 110. In this arrangement, the utility company 106 is responsible for collecting individual payments from each customer 102 and for managing any disputes that arise. This process is repeated for each of the thousands—sometimes millions—of customers of the utility company 106. The traditional utility distribution and billing arrangement is a costly and inefficient process for all parties involved in the utility payment and billing. As described in further detail below, the system 100 addresses the inefficiencies of the traditional utility billing and collections arrangement.

In system 100, the utility company 106 contracts with the financial institution 104 to arrange for the financial institution 104 to provide aggregate payment for the utility usage of a plurality of customers 102. The plurality of customers 102 may be a subset of the entire customer pool of the utility company 106. The plurality of customers 102 are both customers of the utility company 106 and account holders with the financial institution 104. The financial institution 104 receives each customer's utility usage information from a respective utility meter 110 associated with the customer 102. Based on aggregate usage information for all customers opting into the batch billing system and current utility rates, the financial institution 104 prepares and transmits a bulk or batch payment to the utility company 106.

The utility meter 110 is a smart utility meter that includes a network interface, memory, a processor, and optionally a display. In some arrangements, the utility meter 110 is an Internet of Things (IoT) device. The utility company 106, upon installing the utility meter 110 at the property associated with the customer 102 (e.g., a residence, a workplace, or another property), programs the utility meter 110 with a unique meter identifier and correlates the unique meter identifier with the customer 102. As the utility meter 110 measures the utility usage of the customer 102 at the property, the customer's utility usage is stored in the utility meter's 110 memory. The utility meter 110 communicates data over the network 114 via the network interface. In some arrangements, the utility meter 110 is configured to periodically transmit usage data (e.g., hourly, daily, weekly, monthly, etc.) along with the unique meter identifier. The data may be transmitted to the utility company computing system 116 or the financial institution computing system 122 via the network 114. In some arrangements, the data relates to operating instructions, such as utility start instructions, utility stop instructions, or the like. In some arrangements, the data stored on the utility meter 110 and data communication privileges associated with the utility meter 110 may be initially limited to the utility company 106. However, as will be described in greater detail below, upon the financial institution 104 agreeing to pay the utility bills of the customer 102, the utility company 106 provides the financial institution 104 with access to the information stored on the utility meter 110. Additionally, after forming the agreement, the utility company 106 can provide the financial institution 104 with the unique meter identifier associated with the customer 102 for identification of the customer 102 as an account holder with the financial institution 104. Using the meter identifier, the financial institution 104 correlate a particular property's utility usage with a given customer of the financial institution 104.

The customer communication device 112 is a device used by the customer 102 to communicate with other computing systems, such as the utility meter, the utility company computing system 116, the financial institution computing system 122, or the like. The customer communication device may be any of a smartphone, tablet, computer, a PDA, or the like. The customer communication device 112 may have various software/applications installed thereon, including a utility company application, a financial institution application, and third-party applications. Based on the data recorded by the utility meter 110, the customer 102 may receive utility usage data and pay utility bills via a utility company application. Additionally, the customer may input payment preferences as to how to pay utility bills that are transmitted to the utility company computing system 116 via the network 114. Depending on the payment method selected by the customer 102, the utility usage data can be sent, as will be described in greater detail below, to the financial institution 104 for the incorporation of the customer's usage data into a bulk payment to be relayed from the financial institution 104 to the utility company 106.

The utility company computing system 116 is either directly operated by the utility company 106 or by a third-party who manages the accounts of the utility company's customers. The utility company computing system 116 includes a customer account database 118 where information regarding utility usage, payments, and payment preferences of the customer 102 are stored. The utility company computer system 116 may transmit requests for payment to the customer 102 and receive customer payments and update the customer's account in the customer account database 118 accordingly. The utility company computing system 116 can also receive customer payment preferences and adjust the way in which payments from the customer 102 are requested depending on the user's preferred method of payment. For example, when the customer 102 communicates (e.g., via the customer communication device 112) a preference for paying via the customer's financial institution 104, the utility company computing system 116 may make the customer's utility usage data accessible to the financial institution 104. For example, the customer's utility usage information might be transferred from the customer utility account database 118 over the network 114 to the financial institution computing system 122. Alternatively, the utility company computing system 116 may transmit instructions to the utility meter 110 that are received via the network interface thereon and configure the utility meter 110 to transfer the customer usage data to the financial institution computing system 122.

In some arrangements, utility company computing system 116 further includes a customer financial institution database 120, where information regarding the payment responsibilities of the financial institution 104 are stored. For example, if the customer 102 requests via the customer communication device 112 to pay for the utility via the financial institution 104, the utility company computing system 116 either creates or updates the customer financial institution database 120 to indicate that the utility company is no longer responsible for collecting payment from the customer 102. In some arrangements, the customer financial institution database 120 stores the details of the agreement between the financial institution 104 and the utility company 106, such as the rate that the financial institution 104 will pay the utility company 106 for each unit of customer utility usage, the customer identification numbers that the financial institution 104 is responsible for paying for, and the frequency with which the financial institution 104 is obliged to make payments for the utility usage of the customer 102. Upon the receipt of payments from the financial institution 104 and requests from additional customers to pay via the financial institution 104, the utility company computing system 116 may update the customer utility account database 118 and customer financial institution database 120 accordingly.

As noted above, the financial institution 104 includes the financial institution computing system 122. The financial institution computing system 122 includes a processor 124 and memory 126. The memory 126 stores programmable modules that, when executed by the processor 124, control the operation of the financial institution computing system 122. The financial institution computing system 122 includes a network interface 128. The network interface 128 facilitates the sending and receiving of data over the network 114 (e.g., to and from the utility meter 110, to and from the customer communication device 112, to and from the utility company computing system 116, etc.). The financial institution computing system 122 includes a customer account database 130 that stores customer financial information and logs transactions that the customer makes using funds from the financial institution.

In some arrangements, the financial institution computing system 122 includes a customer utility company database 132. The customer utility company database 132 stores the details of the agreement between the financial institution 104 and the utility company 104, such as the utility rates, customer identifiers, and the frequency with which the financial institution 104 is obliged to make payments. The customer utility company database 132 also stores the aggregate utility usage for all of the customers for which the financial institution 104 is obligated to make payments to the utility company. The utility usage data collected by the utility meter 110 of each customer 102 paying for utilities via the financial institution 104 is collected via the network interface 128. The processor 124 is configured to process this data to determine the amount owed to the utility company 106 and to update each of the customer's account balances owed to the financial institution 104.

Figure 2:
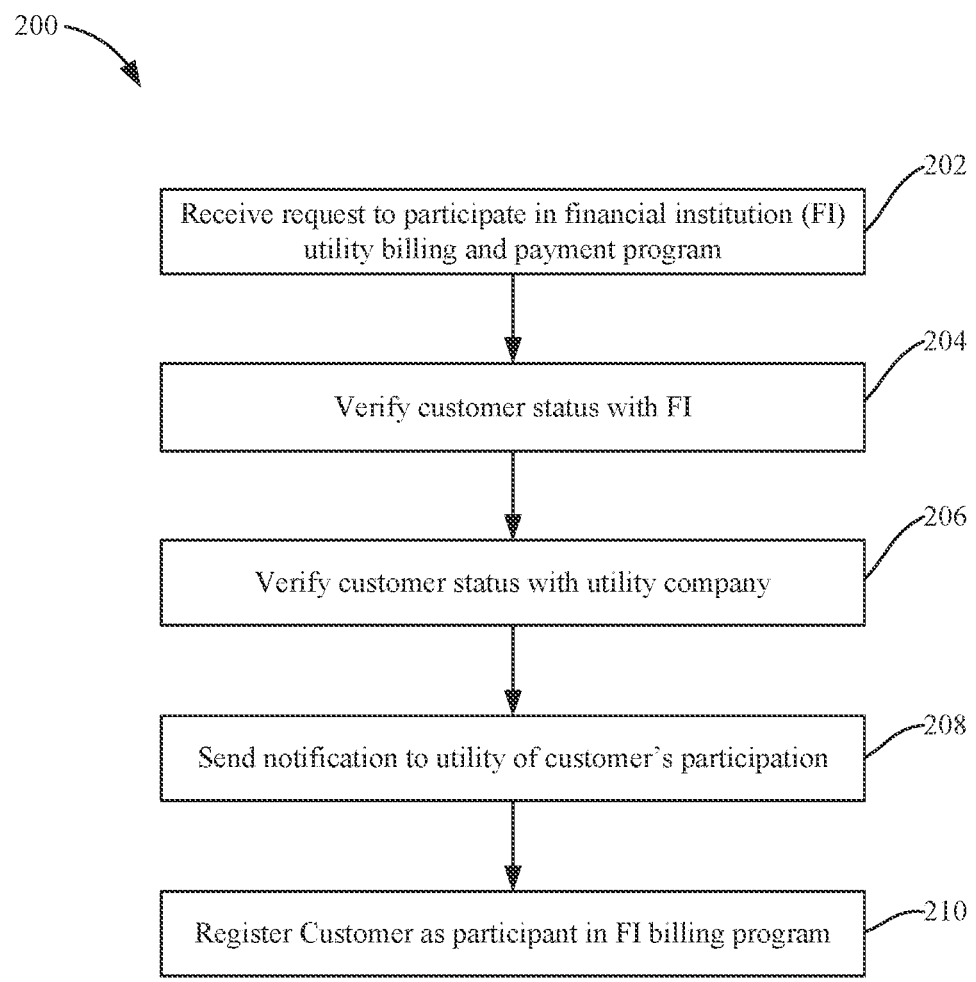
FIG. 2 is a flow diagram of a method of registering a customer for utility billing and payment program offered by a financial institution according to an example embodiment.

With respect to FIG. 2, a flow diagram of a method 200 of registering the customer 102 for the utility billing and payment program offered by the financial institution 104 is shown according to an example embodiment. Method 200 is performed by the financial institution computing system 122 (e.g. by the processor 124). After method 200 is complete, the utility company 106 is relieved of billing and collection duties with respect to the customer 102. The financial institution 104 takes over the billing and collection duties with respect to the customer 102.

Method 200 begins when a customer request to participate in the utility billing and payment program of the financial institution 104 is received at 202. The request is sent by the customer 102 from the customer communication device 112 and is received by the financial institution computing system 122. To transmit the request, the customer 102 may interact with a financial institution application or website displayed on the customer communication device 112. The request indicates that the customer 102 wants the financial institution 104 to handle the billing and collection for the customer's utility usage instead of the utility company 106. In some arrangements, the request is in response to an advertisement or offer from the financial institution 104 or the utility company 106. The request includes at least customer identification information, utility company identification information, utility company customer account information. The customer identification information may relate to, for example, the customer's username associated with a mobile banking portal used to access the financial institution 104, the customer's name, the customer's address, or other identifying information. The utility company identification information allows the financial institution computing system 122 to identify the utility company 106. The utility company identification information may be provided by the customer by interacting with the financial institution application or website (e.g., by selecting from a list of approved utility companies). The utility company customer account information may be in the form of a utility company account number associated with the customer 102 and the utility company 106, customer login credentials associated with an online account management website of the utility company 106, or the like. In some arrangements, the request also includes a utility meter identifier that identifies the utility meter 110 at the property associated with the customer's request.

Based on the information received with the request at 202, the customer's status as an account holder with the financial institution 104 is verified at 204. In some arrangements, in order to enroll in the utility billing and payment program offered by the financial institution 104, the customer 102 must be an account holder with the financial institution 104. Accordingly, the financial institution computing system 122 cross-references the received customer identification information against information stored in the customer financial account database 130. If a match is found, the customer 102 is verified as having an account with the financial institution 104. In the event that the customer 102 is determined to not be an account holder with the financial institution 104, the financial institution computing system 122 transmits an account signup request to the customer communication device 112. The account signup request allows the customer 102 to provide the necessary information to open and fund an account with the financial institution. If the customer provides the required information and initial funding, the financial institution computing system 122 creates a new account for the customer 102 and stores the new account information in the customer financial account database. If the customer 102 does not create a new account and is not an existing account holder, method 200 ends. The description of method 200 continues under the assumption that the customer 102 is an account holder (or creates a new account) with the financial institution 104.

In some arrangements, the financial institution computing system 122 verifies that the customer 102 has a threshold amount of deposited money or a threshold amount of credit required to enroll in the utility billing and payment program at 204. For example, if the customer 102 has a checking account or a savings account with the financial institution 104, the balances of the checking and savings account may be positive. If the customer has a credit account, a home equity line of credit, a mortgage, etc., the account balances may be negative. Stored in the memory 126 of the financial institution computing system 122 may be data tables that contain account thresholds that determine customer eligibility to participate in the financial institution payment method. For example, at 204, the financial institution computing system may determine whether the customer's checking or savings account is above a certain threshold. Alternatively, if the customer is running a negative account balance, the financial institution computing system may determine that the customer's amount owed to the financial system is below a certain threshold. If the threshold conditions for customer participation in the payment method are not met, then the method 200 ends. The description of method 200 continues under the assumption that the customer 102 has the appropriate amount of funds or credit available.

After 204, the customer 102 is verified as a customer of the utility company 106 at 206. The financial institution computing system 122 verifies the customer 102 as a customer of the utility company 106 by sending a message to the utility company computing system 116 indicating the customer identification information and/or the utility company customer account information received at 202. The utility company computing system 116 cross-references the received customer identification information and/or the utility company customer account information against the customer utility account database 118 to determine if the customer 102 is a customer of the utility company 106. If the customer 102 is not a customer of the utility company 106, the utility company computing system 116 transmits a denial message to the financial institution computing system 122, and method 200 ends. If the customer 102 is a customer of the utility company 106, the utility company computing system 116 transmits an approval message to the financial institution computing system 122. The approval message confirms the customer's status as a customer of the utility company 106. In some arrangements, the approval message includes the unique identification of the utility meter 110 associated with the customer, the current balance of the account associated with the customer, and the agreed upon utility rate (i.e., cost per unit of utility) the customer 102 pays the utility company 106.

After verifying the customer's status with the utility company, an approval message is sent to the customer 102 at 208. The approval message is sent from the financial institution computing system 122 to the customer communication device 112. The approval message indicates that the customer is approved for the utility billing and payment service offered by the financial institution 104. The approval message may include terms that need to be accepted by the customer 102 prior to finalizing the customer's enrollment in the utility billing and payment service. In some circumstances, the customer 102 may have a plurality of accounts with the utility company 106. For example, the customer 102 may have a plurality of properties that each receive electricity from the utility company 106 and that each have an individual utility meter 110. In these circumstances, the approval message may require that the customer 102 provide an indication as to which of the properties or utility meters 110 are to be enrolled in the utility billing and payment service (e.g., by checking or unchecking boxes on a user interface presented on the customer communication device 112) to the financial institution computing system 122.

After the customer 102 provides the necessary approvals and any required indications of utility meters 110 to be enrolled in the utility billing and payment program, the customer 102 is registered as a participant in the utility billing and payment program at 210. The financial institution computing system 122 stores the customer's utility information (e.g., any utility meter identifiers, rate information, property information, utility account numbers, etc.) in the customer utility company database 132. As described in further detail below, when the customer 102 is enrolled in the utility billing and payment program, the utility company 106 is relieved of billing and collection duties with respect to the customer 102, and the financial institution 104 assumes these duties. In return, the financial institution 104 issues periodic batch payments to the utility company 106 for all customers enrolled in the utility company billing and payment service offered by the financial institution 104.

Figure 3:
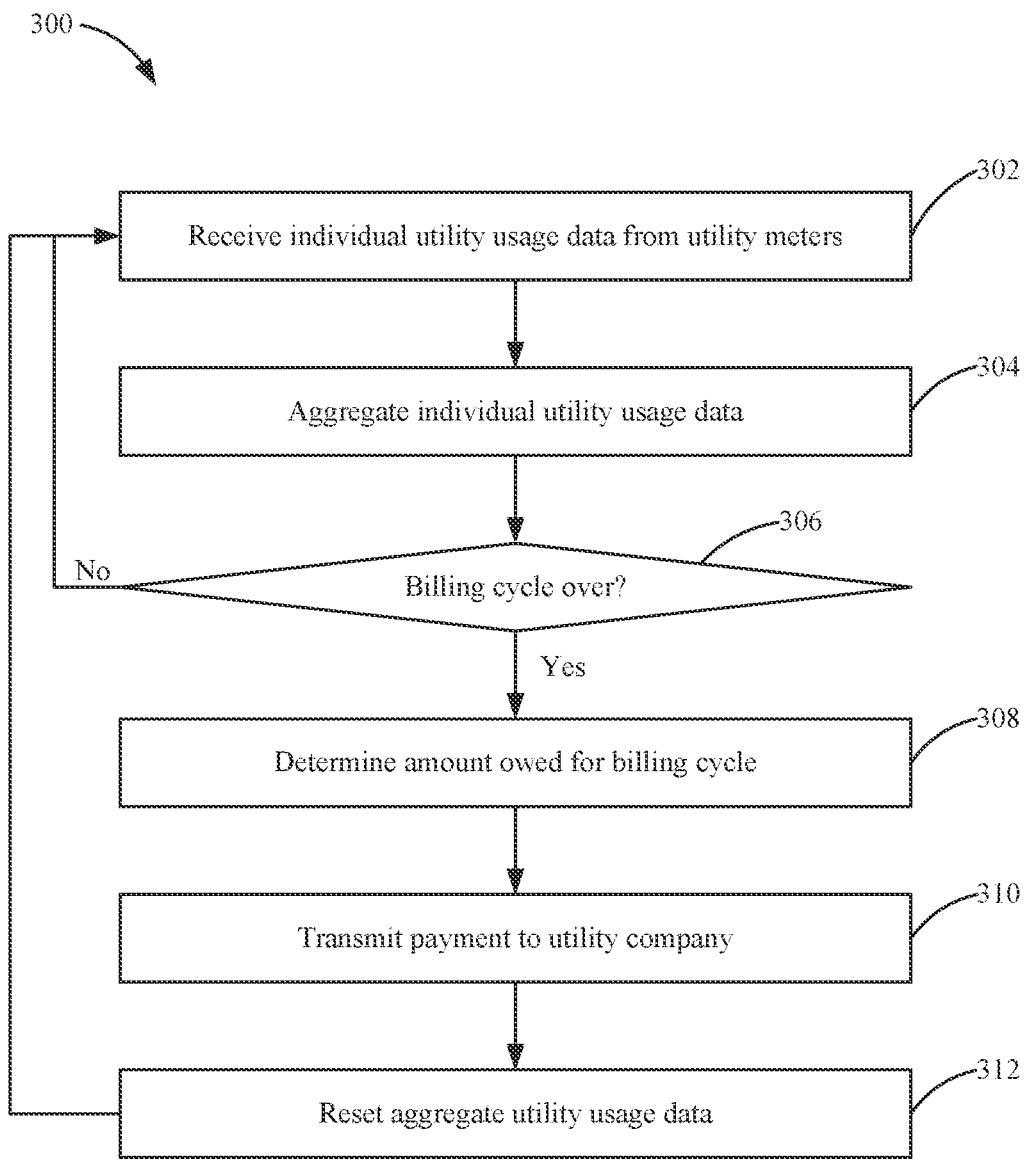
FIG. 3 is a flow diagram of a method of providing batch payment to a utility company according to an example embodiment.

Referring to FIG. 3, a flow diagram of a method of providing batch payment to the utility company 106 is shown according to an example embodiment. The method 300 is performed by the financial institution computing system 122 (e.g., by processor 124). The batch payment is provided from the financial institution 104 to the utility company 106 for all customers 102 enrolled in the utility billing and collection program provided by the financial institution 104. Each customer 102 enrolls in the program through method 200 (described above with respect to FIG. 2).

Method 300 begins when utility usage data from the utility meters 110 is received at 302. The utility usage data is received by the financial institution computing system 122 from each of the utility meters 110 associated with each of the customers 102 enrolled in the utility billing and collection program. Each utility meter 110 transmits individual utility usage data for the property serviced by the utility meter 110. The individual utility usage data includes the unique utility meter identifier associated with the given utility meter 110, and a quantity of utility provided to the utility meter 110. The quantity of the utility provided may relate to an amount of kilowatt hours of electricity, a number of gallons of water, a number of cubic feet of natural gas, or the like. In some arrangements, the utility usage data includes additional utility usage metrics (e.g., rate of usage, time of usage, etc.). The utility usage data is received by the financial institution computing system 122 at regular time intervals (e.g., hourly, daily, weekly, monthly, etc.). In some arrangements, the utility usage data is received in real-time. To ensure proper payment, the financial institution computing system 122 cross-references each unique utility meter identifier with known unique utility meter identifiers associated with enrolled customers 102 (e.g., by cross-referencing a listing of known unique utility meter identifiers stored in the customer utility company database 132). If utility usage data is received from non-enrolled utility meters, that utility usage data may be discarded by the financial institution computing system 122.

The received individual utility usage data is aggregated at 304. Each non-discarded individual utility meter usage data is totaled by the financial institution computing system 122 to determine an aggregate amount of utility usage used by the customers enrolled in the utility billing and payment program provided by the financial institution 104. The financial institution computing system 122 stores the aggregate amount of utility usage in the customer utility company database 132. In some arrangements, the aggregate amount of utility usage is continuously updated within a given billing cycle (e.g., as described below with respect to 306).

The financial institution computing system 122 determines if the billing cycle is over at 306. The billing cycle corresponds to the agreed upon billing period between the financial institution 104 and the utility company 106. For example, the agreed upon billing period may dictate that the financial institution 104 makes monthly batch payments to the utility company 106 for all utility usage of enrolled customers during a given month. If the billing cycle is not over, method 300 returns to 302.

If the financial institution computing system 122 determines that the billing cycle is over at 306, the total amount owed for the billing cycle is determined at 308. In some arrangements, the financial institution 104 contracts with the utility company 106 to pay a flat rate for each unit of utility used by the customers 102 enrolled in the utility billing and payment program. In such arrangements, the financial institution computing system 122 multiplies the aggregate utility usage calculated at 304 by the flat rate to determine the total amount owed to the utility company 106. In other arrangements, each customer's usage (or utility meter's usage) may be assessed a different rate by the utility company 106. In such arrangements, the financial institution computing system 122 multiplies each individual usage data over the course of the billing cycle by the individual rate charged by the utility company 106. This calculation is repeated for each customer 102 to determine the total amount owed to the utility company 106.

Payment is transmitted to the utility company 106 at 310. The financial institution computing system 122 transmits payment to the utility company 106. In some arrangements, the financial institution computing system 122 transmits payment via an account clearing house (ACH) transfer or a wire transfer. In other arrangements, the financial institution computing system 122 sends a payment request to a check processing vendor that issues a check to the utility company 106. In further arrangements, the utility company 106 is an account holder with the financial institution 104. In these arrangements, the utility company 106 performs an internal transfer of funds between a financial institution holding account and an account held by the utility company 106 (e.g., by updating the customer financial account database 130). In some arrangements, the payment made by the financial institution 104 to the utility company 106 is guaranteed. Accordingly, the payment is not contingent on the financial institution 104 receiving payments from the individual customers 102. In exchange for the guaranteed payment, the financial institution 104 may negotiate a discounted utility rate from the utility company 106 such that the financial institution 104 can collect a surcharge from the customers 102. Alternatively, in exchange for the guaranteed payment, the utility company 106 can pay the financial institution 104 a guarantee fee. In some circumstances, the utility company 106 shifts responsibility of turning on or off provision of the utility through a utility meter 110 at the time of accepting the guarantee. The financial institution 104 can then control (i.e., suspend, restart, stop, start, meter, etc.) provision of the utility to a given customer based on the account status. For example, if the customer is way behind on payments, the financial institution computing system 122 can transmit a stop utility message to the appropriate utility meter 110 such that the customer cannot accumulate more debt from utility usage.

In arrangements where the financial institution computing system 122 maintains a running total aggregate utility usage amount, the aggregate utility usage data is reset at 312. The financial institution computing system 122 resets (i.e., zeroes) the aggregate utility usage data, and the method 300 returns to 302. If the aggregate utility usage amount is not a running total, the method restarts at after 310.

Figure 4:
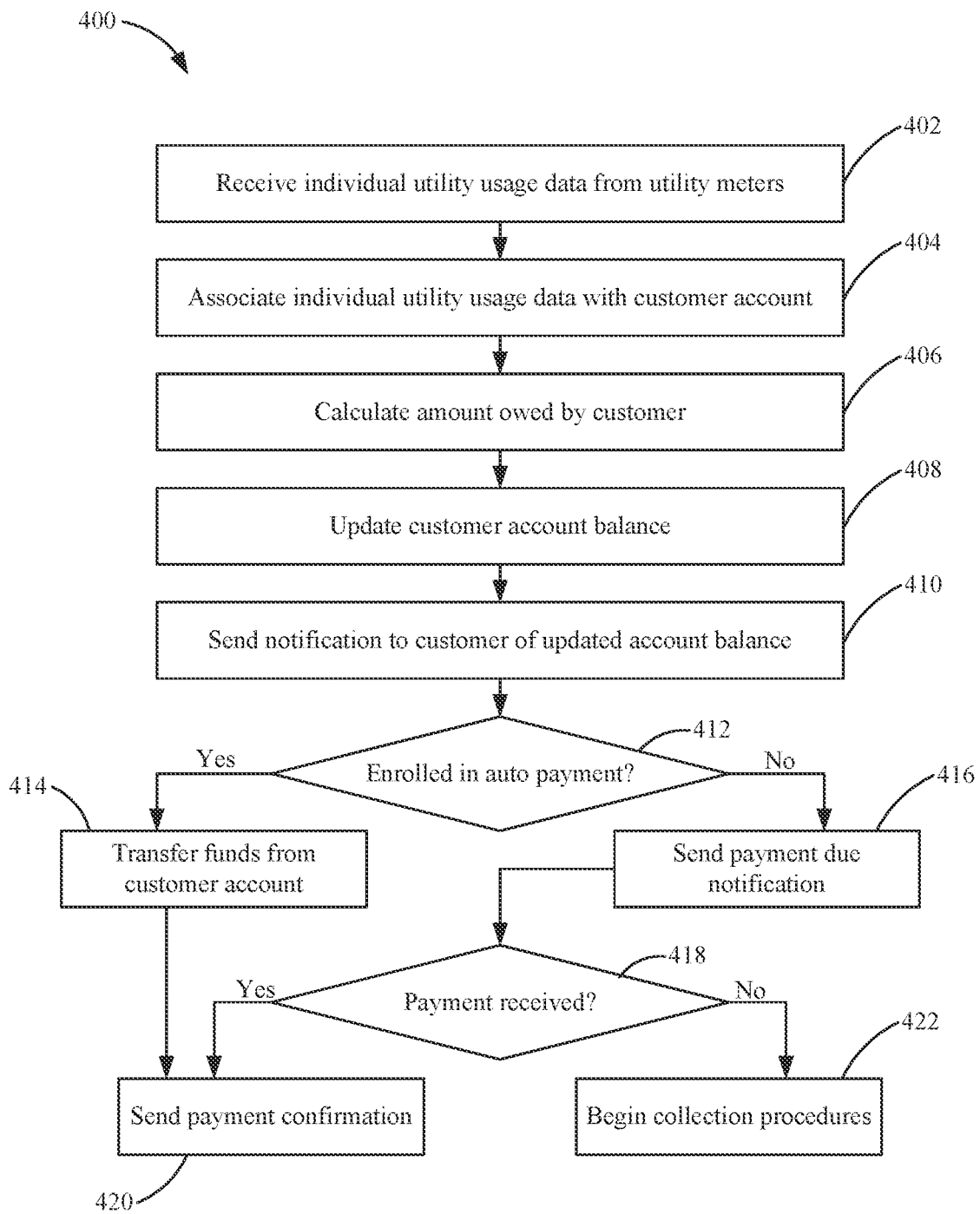
FIG. 4 is a flow diagram of a method of receiving payment from a customer for utility usage according to an example embodiment.

Referring to FIG. 4, a method of receiving payment from a customer 102 for utility usage is shown according to an example embodiment. The method 400 is performed by the financial institution computing system 122 (e.g., by processor 124). The method 400 begins when utility usage data from the utility meters 110 is received at 402. The utility usage data is received by the financial institution computing system 122 from each of the utility meters 110 associated with each of the customers 102 enrolled in the utility billing and collection program. Each utility meter 110 transmits individual utility usage data for the property serviced by the utility meter 110. The individual utility usage data includes the unique utility meter identifier associated with the given utility meter 110, and a quantity of utility provided by the utility meter 110. The quantity of the utility provided may relate to an amount of kilowatt hours of electricity, a number of gallons of water, a number of cubic feet of natural gas, or the like. In some arrangements, the utility usage data includes additional utility usage metrics (e.g., rate of usage, time of usage, etc.). The utility usage data is received by the financial institution computing system 122 at regular time intervals (e.g., hourly, daily, weekly, monthly, etc.). In some arrangements, the utility usage data is received in real-time.

The individual utility usage data is associated with identified customer accounts at 404. The financial institution computing system 122 cross-references each unique utility meter identifier with known unique utility meter identifiers associated with enrolled customers 102 (e.g., by cross-referencing a listing of known unique utility meter identifiers stored in the customer utility company database 132). The financial institution computing system 122 associates the individual utility usage data with a matched customer. The association is stored in the customer utility company database 132. If utility usage data is received from non-enrolled utility meters, that utility usage data may be discarded by the financial institution computing system 122.

The amount owed by the customer is calculated at 406. The financial institution computing system 122 calculates the amount of money owed to the financial institution 104 based on each customer's individual usage. The amount owed is calculated by multiplying the customer's individual utility usage amount received at 402 by the cost of each unit of the utility (e.g., each kilowatt hour electricity, each cubic foot of natural gas, each gallon of water, etc.). The cost of each unit of the utility may be different for each customer 102. Additionally, the cost of each unit of the utility assessed to each customer 102 may be different (e.g., more expensive) than the cost of each unit of the utility charged to the financial institution 104 by the utility company 106. The markup in the cost of each unit of the utility may be retained by the financial institution 104 as a fee for taking over the billing and collection responsibilities from the utility company 106.

Each customer account balance is updated at 408. The financial institution computing system 122 updates each customer account balance based on the amount owed calculated at 406. The updated account balances are stored in the customer utility company database 132.

A notification is sent to each customer 102 indicating the updated account balance at 410. The financial institution computing system 122 sends the notification to each customer (e.g., via the customer communication device 112). The notification includes an account balance, an indication of utility usage amount, and an indication of a due date. The notification may be any of an e-mail, an e-statement, a paper statement, an online banking message, or the like. In some arrangements, the notification includes an alert that an expected utility future utility bill will overdraw an account (e.g., a checking account or savings account) at the due date. In such arrangements, the account alert or notification is based at least in part on both (1) current account balance information of a customer's checking or savings account and (2) current utility usage or usage trends of the customer. If the customer is at risk of overdrawing the account used to pay the utility bill, the financial institution 122 can suggest a transfer between accounts for the expected overage. Alternatively, if the customer is at risk of overdrawing the account used to pay the utility bill, the financial institution 122 may provide the customer the option to shut off provision of the utility through the utility meter 110 associated with the utility account. Accordingly, the financial institution computing system 122 can transmitting a stop signal to the utility meter 110 associated with the customer account.

The financial institution computing system 122 determines whether the customer 102 is enrolled in auto payment at 412. The customer 102 may be enrolled in an auto payment program offered by the financial institution 104. If enrolled in the auto payment program, the financial institution 104 is authorized to transfer funds directly from a customer account held with the financial institution 104. In some arrangements, there may be a limit on the amount of funds transferred. For example, the customer 102 can authorize the financial institution 104 to automatically transfer up to a designated amount of money (e.g., $100) each month to pay for the utility. If the amount owed for the utility usage is in excess of $100, the customer 102 may wish to receive an alert of the unusually high utility bill prior to sending payment. Accordingly, at 412, the financial institution computing system 122 determines whether the customer is enrolled in the auto payment program and if the updated account balance is less than or equal to the designated amount of money (if applicable). The auto payment program can be incentivized by the financial institution 104 to encourage customers 102 to enroll in the auto payment program. For example, the financial institution 104 can offer the customers a discounted utility rate, a rebate, or the like for enrolling in the auto payment program. If the customer is to receive an alert (e.g., as described above), the financial institution computing system 122 transmits the requested alert.

If the customer is enrolled in the auto payment program, and if the updated account balance is less than or equal to the designated amount of money, funds are transferred from the customer account at 414. In some arrangements, the transfer occurs internally between accounts held within the financial institution 104. In these arrangements, the financial institution computing system 122 performs the transfer of funds by executing an internal transfer from an account associated with the customer 102 held with the financial institution 104 to an account held by the financial institution 104 (e.g., a holding account, an escrow account, etc.). The internal transfer avoids the costs and time delays associated with performing an ACH transfer, a check transaction, or a credit/debit card transaction. The financial institution computing system 122 effectuates the transaction by updating the customer financial account database 130 accordingly. In other arrangements, the customer 102 provides alternate payment sources, such as an account with another financial institution, a credit card, a debit card, an electronic check, a paper check, or the like. In such arrangements, the financial institution computing system 122 initiates the transfer of funds via an appropriate method, such as initiating an ACH transfer from the account with the other financial institution to the holding account at the financial institution 104, initiating a credit card charge, performing a check deposit, or the like. After the transfer of funds occurs, a payment confirmation is sent by the financial institution computing system 122 to the customer 102 (as discussed in further detail below with respect to 420).

If the customer is not enrolled in the auto payment program, or if the updated account balance is greater than the designated amount of money, a payment due notification is sent at 416. The financial institution computing system 122 sends the payment due notification to the customer 102 via the customer communication device 112. In some arrangements, the payment due notification is included in the notification sent at 410. The payment due notification includes an indication of an amount owed to the financial institution 104 for the utility usage and a due date for making payment.

Still referring to FIG. 4, at 418, the financial institution computing system 122 determines if payment was received within the due date of the notification sent at 416. If a payment was received, a payment confirmation is sent at 420. The payment may be received either in response to the notification sent at 416 or as a result of the transfer at 414. The financial institution computing system 122 sends the payment confirmation to the customer 102 via the customer communication device 112. The payment confirmation may be any of an e-mail, an e-statement, a paper statement, an online banking message, or the like. In some arrangements, the financial institution 104 can incentivize early payments ahead of the due date. For example, the financial institution 104 may offer a slight discount to customers paying the utility bill ahead of the due date. As another example, the financial institution 104 can incentivize a group of customers enrolled in the utility billing and payment program by offering a group discount if a threshold number of customers pay early (e.g., if 70% of customers pay early, everybody in the group gets a 5% discount). In other arrangements, the financial institution 104 can provide advice to delay customer payment for the utility past the due date by providing the customer 102 with investment advice. For example, in some situations, the late fee associated with paying the utility bill past the due date is less money than can be made by utilizing that same money in a short-term investment product offered by the financial institution 104.

If payment was not received within the due date of the notification sent at 416, the financial institution computing system 122 may begin collection procedures at 422. The collection procedures may include any of freezing funds in a customer account held at the financial institution 104, stopping utility delivery via the utility meter 110 (e.g., by transmitting a stop instruction to the utility meter 110), sending additional payment notices, or a combination thereof. One such collection procedure is described below with respect to FIG. 5. Method 400 is repeated for each customer enrolled in the utility billing and payment program offered by the financial institution 104.

Figure 5:
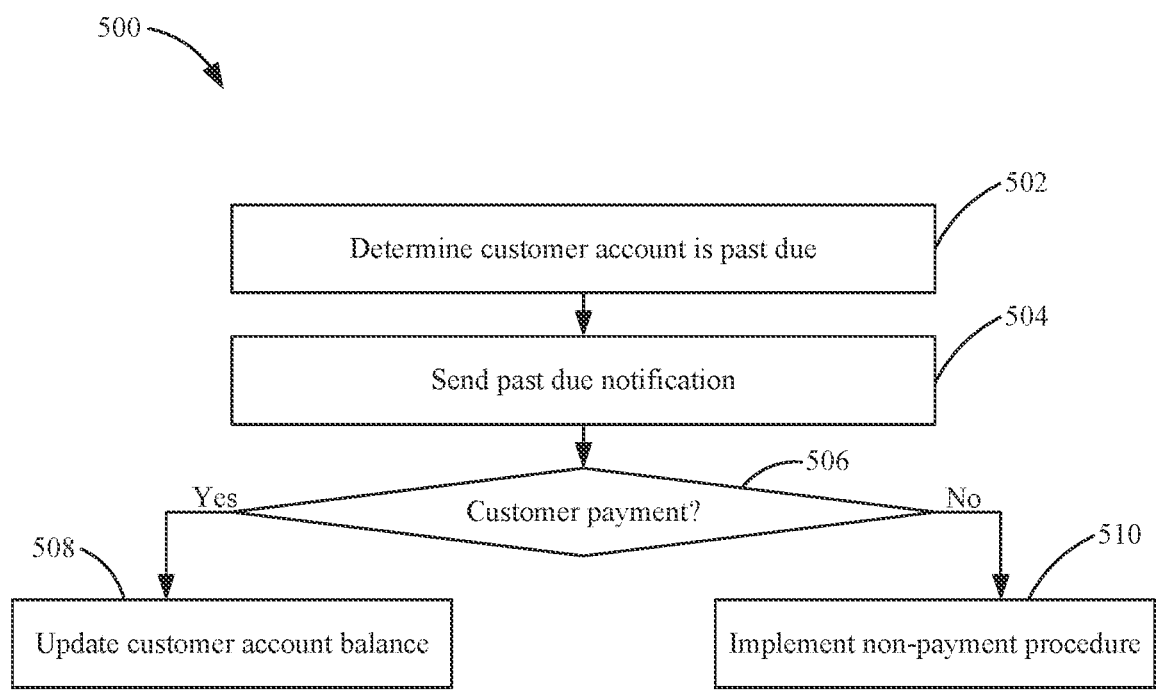
FIG. 5 is a flow diagram of a method of taking action with respect to a past-due customer utility account according to an example embodiment.

Referring to FIG. 5, a flow diagram of a method 500 of taking action with respect to a past-due customer account according to an example embodiment. The method 500 is performed by the financial institution computing system 122 (e.g., by processor 124). The method 500 may be performed, for example, in place of or after 422 of the method 400.

A customer account is determined to be past due at 502. The financial institution computing system 122 determines that the customer account is past due based on utility billing and payment account information stored in the customer utility company database 132. An account may be considered past due if the customer 102 associated with the customer account owes a threshold amount of money to the financial institution 104 and/or the customer has not provided a minimum (or full) payment on an owed amount after a threshold amount of time (e.g., a number of months, a year, etc.).

A past due notification is sent at 504. The financial institution computing system 122 sends the past due notification to the customer 102 via the customer communication device 112. The past due notification may be any of an e-mail, an e-statement, a paper statement, an online banking message, or the like. The past due notification includes an indication of the amount owed, including any interest or late fees, and an indication of the final date to make payment before non-payment procedures (e.g., account collection procedures, utility shutoff, etc.) are implemented.

The financial institution computing system 122 determines whether the customer 102 made a payment within the payment window at 506. If a customer payment is received within the payment window, the customer's account balance is updated. The financial institution computing system 122 updates the customer utility company database 132 to reflect the new balance. If a customer payment is not received within the payment window, non-payment procedures are implemented at 510. The non-payment procedures include any combination of freezing funds in a customer account held with the financial institution 104, transferring funds from a customer account held with the financial institution 104, notifying a collection agency of the past due account, or a combination thereof. In some arrangements, the non-payment procedures include transmitting a stop signal to the utility meter 110 associated with the customer account. Once the stop signal is received by the utility meter 110, the utility meter 110 cuts off provision of the utility to the location serviced by the meter 110. The stop signal may be transmitted directly by the financial institution computing system 122. In other arrangements, the stop signal is transmitted by the utility company computing system 116 after receiving a request from the financial institution computing system 122.

The above-described utility billing and payment program achieves more efficient utility billing and payment than traditional utility billing and payment schemes. The above-described utility billing and payment program avoids the expenses (e.g., bill mailing costs, transaction costs, collection costs, etc.) associated with individual billing and collection. Additionally, because many of the customer utility payments occur wholly within the financial institution 104, the payments can be processed and received quicker than in the traditional utility billing and payment schemes. The above-described utility billing and payment program can be modified to non-utility providing billers, such as merchants or entities having a large number of recurring customers or paying parties (e.g., fitness centers collecting membership dues, government agencies collecting taxes, crowd-funding groups collecting payments, etc.).

The above-described utility billing and payment program also provides the financial institution 104 with additional information about its customers 102. The additional information can be leveraged by the financial institution 104 to increase the effectiveness of other products provided to the customers 102, such as budgeting tools, financial planning services, and the like. For example, the financial institution 104 can recommend to a customer to adjust a water heater temperature or a home thermostat to help achieve savings goals based on the additional information gained from the customer's participation in the utility billing and payment program.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. The present embodiments contemplate methods, systems and program products on any machine-readable media for accomplishing its operations. The embodiments of may be implemented using an existing computer processor, or by a special purpose computer processor incorporated for this or another purpose or by a hardwired system.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that performs particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

Any foregoing references to currency or funds are intended to include both fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of controlling provision of utility by a computing system associated with a financial institution, the computing system includes a financial database that stores customer financial information concerning a plurality of account holders for accounts with the financial institution and a utility database that stores associations between a set of utility meters associated with a plurality of customers of a utility company and the plurality of account holders for the accounts with the financial institution, the plurality of account holders includes a user associated with a utility meter of the set of utility meters, the method comprising:

verifying, by the computing system, a negative account balance associated with the user is below an enrollment threshold, the negative account balance comprising a balance owed to the financial institution from the account of the user with the financial institution;

in response to determining that the negative account balance is below the enrollment threshold, enrolling, by the computing system, the user into a utility billing and payment program offered by the financial institution;

in response to enrolling the user into the utility billing and payment program, determining, by the computing system, that a negative utility account balance of the negative account balance exceeds a balance threshold permitted past due amount, the negative utility account balance associated with the utility meter; and in response to determining that the negative utility account balance exceeds the balance threshold, sending, by the computing system, a stop signal to the utility meter, the stop signal instructing the utility meter to cut off the provision of the utility to a property serviced by the utility meter.

2. The method of claim 1, further comprising:
receiving, by the computing system, a payment from the user; and
sending, by the computing system, a start signal to the utility meter to restart provision of the utility to the property serviced by the utility meter.

3. The method of claim 1, wherein sending the stop signal to the utility meter is further in response to not receiving a minimum payment from the user towards the negative utility account balance after a threshold amount of time.

4. The method of claim 1, further comprising:
receiving, by the computing system from the user, a payment associated with the negative utility account balance; and
transferring, by the computing system, funds from the account of the user with the financial institution to a holding account of the financial institution.

5. The method of claim 1, further comprising sending, by the computing device, a past due notification to a communication device of the user, the notification comprising an indication of the utility account balance.

6. The method of claim 1, further comprising receiving, by the computing system, utility usage information from the utility meter, the utility usage information comprises a unique utility meter identifier for the utility meter and a quantity of the utility provided by the utility meter.

7. The method of claim 6, further comprising determining, by the computing system, an aggregate amount of utility usage used by a plurality of users of the utility company for a billing cycle by aggregating, by the computing system, the received utility usage information for the billing cycle.

8. A computing system for controlling provision of utility, the computing system associated with a financial institution, the computing system includes a financial database that stores customer financial information concerning a plurality of account holders for accounts with the financial institution and a utility database that stores associations between a set of utility meters associated with a plurality of customers of a utility company and the plurality of account holders for the accounts with the financial institution, the plurality of account holders includes a user associated with a utility meter of the set of utility meters, the computing system comprising a processor configured to:

verify a negative account balance associated with the user is below an enrollment threshold, the negative account balance comprising a balance owed to the financial institution from the account of the user with the financial institution;

in response to determining that the negative account balance is below the enrollment threshold, enroll the user into a utility billing and payment program offered by the financial institution;

in response to enrolling the user into the utility billing and payment program, determine that a negative utility account balance of the negative account balance exceeds a balance threshold permitted past due amount, the negative utility account balance associated with the utility meter; and in response to determining that the negative utility account balance exceeds the balance threshold, send a stop signal to the utility meter, the stop signal instructing the utility meter to cut off the provision of the utility to a property serviced by the utility meter.

9. The computing system of claim 8, wherein the processor is further configured to:
receive a payment from the user; and
send a start signal to the utility meter to restart provision of the utility to the property serviced by the utility meter.

10. The computing system of claim 8, wherein the processor is further configured to receive a payment from the user, and wherein the payment is associated with the utility account balance for the user.

11. The computing system of claim 10, wherein receiving the payment comprises, in response to determining that the user is enrolled in an auto payment program, transferring funds from the account of the user with the financial institution to a holding account of the financial institution.

12. The computing system of claim 8, wherein the processor is further configured to send a past due notification to a communication device of the user, the notification comprising an indication of the utility account balance.

13. The computing system of claim 8, wherein the processor is further configured to receive utility usage information from the utility meter, the utility usage information comprises a unique utility meter identifier for the utility meter and a quantity of the utility provided by the utility meter.

14. The computing system of claim 8, wherein the processor is further configured to determine an aggregate amount of utility usage used by a plurality of users of the utility company for a billing cycle by aggregating the received utility usage information for the billing cycle.

15. A non-transitory computer-readable medium having computer-executable instructions embodied therein that, when executed by a processor of a computing system associated with a financial institution, cause the computing system to control provision of utility, the computing system includes a financial database that stores customer financial information concerning a plurality of account holders for accounts with the financial institution and a utility database that stores associations between a set of utility meters associated with a plurality of customers of a utility company and the plurality of account holders for the accounts with the financial institution, the plurality of account holders includes a user associated with a utility meter of the set of utility meters, the processor is caused to:

verify a negative account balance associated with the user is below an enrollment threshold, the negative account balance comprising a balance owed to the financial institution from the account of the user with the financial institution;

in response to determining that the negative account balance is below the enrollment threshold, enroll the user into a utility billing and payment program offered by the financial institution;

in response to enrolling the user into the utility billing and payment program, determine that a negative utility account balance of the negative account balance exceeds a balance threshold permitted past due amount, the negative utility account balance associated with the utility meter; and in response to determining that the negative utility account balance exceeds the balance threshold, send a stop signal to the utility meter, the stop signal instructing the utility meter to cut off the provision of the utility to a property serviced by the utility meter.

16. The non-transitory computer-readable medium of claim 15, the processor further caused to:
  receive a payment from the user; and
  send a start signal to the utility meter to restart provision of the utility to the property serviced by the utility meter.

17. The non-transitory computer-readable medium of claim 15, the processor further caused to receive a payment from the user, wherein the payment is associated with the utility account balance for the user.

18. The non-transitory computer-readable medium of claim 17, wherein receiving the payment comprises, in response to determining that the user is enrolled in an auto payment program, transferring funds from the account of the user with the financial institution to a holding account of the financial institution.

19. The non-transitory computer-readable medium of claim 15, the processor further caused to send a past due notification to a communication device of the user, the notification comprising an indication of the utility account balance.

20. The non-transitory computer-readable medium of claim 15, the processor further caused to receive utility usage information from the utility meter, the utility usage information comprises a unique utility meter identifier for the utility meter and a quantity of the utility provided by the utility meter.

\* \* \* \* \*